United States Patent [19]
Grund et al.

[11] Patent Number: 5,878,633
[45] Date of Patent: Mar. 9, 1999

[54] MACHINE TOOL HAVING A TURNTABLE

[75] Inventors: Peter Grund, Trossingen; Anton Schweizer, Wurmlingen, both of Germany

[73] Assignee: Chiron-Werke GmbH & Co. KG, Tuttlingen, Germany

[21] Appl. No.: 832,765

[22] Filed: Apr. 4, 1997

[30] Foreign Application Priority Data

Apr. 19, 1996 [DE] Germany .................. 196 15 425.1

[51] Int. Cl.[6] .................................................. B23Q 16/02
[52] U.S. Cl. .......................................................... 74/813 R
[58] Field of Search .................... 74/826, 813 R, 74/813 L, 813 C; 29/33 J, 33 P, 39, 563, 564

[56] References Cited

U.S. PATENT DOCUMENTS

| | | |
|---|---|---|
| 2,911,767 | 11/1959 | Sielemann . |
| 3,170,375 | 2/1965 | Weidauer . |
| 3,905,257 | 9/1975 | Thumm et al. .................... 74/826 X |
| 4,380,939 | 4/1983 | Gardner ............................. 74/826 X |
| 4,850,764 | 7/1989 | Rütschle et al. . |
| 5,628,104 | 5/1997 | Rütschle et al. . |

FOREIGN PATENT DOCUMENTS

| | | |
|---|---|---|
| 0 564 842 A1 | 10/1993 | European Pat. Off. . |
| 30 25 638 C2 | 1/1982 | Germany . |
| 83 16 776 | 11/1983 | Germany . |
| 36 20 086 | 12/1987 | Germany . |
| 40 38 660 A1 | 6/1992 | Germany . |

OTHER PUBLICATIONS

Werkstatttechnik, Zeitschrift für industrielle Fertigung, vol. 68, No. 2, Feb. 1978, Berlin, Germany, pp. 73–75, J. Feulner: Druckölversorgung hydraulischer Spannelemente auf schwenk–und drehbaren Einrichtungen.[4].

Primary Examiner—Charles A. Marmor
Assistant Examiner—Mary Ann Battista
Attorney, Agent, or Firm—Cummings & Lockwood

[57] ABSTRACT

A machine tool comprises a turntable that has a table plate, pivotable about a rotation axis with respect to a machine frame, onto the upper side of which lead lines, coming from beneath the table plate, that are connected to stationary supply connections. The lines are attached to the table plate from below, by means of downward-pointing connector pieces that are joined nonrotatably to the table plate in its center region, in such a way that they hang freely downward.

19 Claims, 3 Drawing Sheets

MACHINE TOOL HAVING A TURNTABLE

RELATED PRIOR ART

A machine tool of this kind is known from DE 83 16 776 U1.

In the case of the known machine tool, a connection box is installed permanently on the turntable. Plug connections are provided in a side wall of the connection box that is joined nonrotatably to the turntable, while a rotary coupling is arranged on the upper side of the connection box that is stationary with respect to the turntable.

The cover of the connection box constituting the upper side is joined to a tube which passes through the table and is stationary, i.e. does not participate in the rotation of the table. Connection lines, of which one is connected from below to the rotary coupling, run upward in the tube. Fluid delivered via the connection line can be drawn off, from the rotary coupling, via a further line. When the table rotates, the upper part of the connection box remains stationary, while the line for drawing off fluid via the rotary coupling rotates along with the table. This rotation is possible, according to this document, because the rotary coupling is located centeredly in the rotation axis of the turntable.

The plug connections in the side wall of the connection box that rotates along with the table are joined to lines that are routed in the interior of the connection box, optionally in multiple-turn loops, so that with corresponding play or clearance they allow rotation of the turntable as the loops unwind or wind up.

A turntable of this kind is used in machine tools in which at least two workpieces, which by rotation of the turntable are offered in succession to a spindle for machining, are arranged on the upper side of the turntable. The lines carry drilling and flushing fluid, hydraulic oil, or compressed air to the upper side of the turntable, where they are used to actuate a workpiece receptacle, for flushing during workpiece machining, etc. These fluids are provided to stationary supply connections that are joined via the lines to the upper side of the rotating table plate.

In the case of the known machine tool, a line running centeredly with respect to the rotation axis of the table plate is joined to the rotary coupling, while the lines running outside the rotation axis are routed in loops on the table plate inside the connection box. Lines can thus lead to the upper side of the table plate both in the rotation axis and outside the rotation axis, and there provide the necessary fluids.

Practical experience has shown that in the case of the known machine tools, the connection box is disadvantageous in that it requires a relatively large amount of space on the workpiece table, so that the space for clamping workpieces is perceptibly diminished by the connection box. It is desirable, however, in the design of such machine tools, to design them with the minimum possible outside dimensions, so that the space on the table plate of the turntable, as elsewhere, can be utilized as well as possible. The known machine tool does not meet these criteria.

A further disadvantage of the known machine tool is the fact that the mechanism consisting of connection box and tube is relatively complex and therefore very cost-intensive.

It is already known from DE 36 20 086 C2 to solve the aforesaid space problem by connecting the lines above the workpiece table to a point in the vicinity of the rotation axis at a stationary point on the machine tool, and connecting them, hanging down loosely, to a connection box on the workpiece table.

Since the lines are connected at the top in the vicinity of the rotation axis of the table plate, the result when the workpiece table is rotated respectively 180 degrees back and forth is a symmetrical movement which only minimally mechanically deforms the lines.

A disadvantage with these lines hanging freely downward, however, is that on the one hand they can be mechanically damaged and on the other hand they are continually exposed to the effects of coolants and flushing agents, which exert an aggressive influence on the plastic and rubber insulation of the lines. Moreover the hanging lines are an obstacle when operating personnel must perform installation or maintenance work in the vicinity of the turntable.

SUMMARY OF THE INVENTION

Proceeding herefrom, it is an object of the present invention to improve the machine tool mentioned at the outset in such a way that with a simple design, it is possible to connect even multiple lines to the rotating table plate, the space requirement on the upper side of the table plate being minimized.

In the case of the machine tool mentioned at the outset, this object is achieved according to the invention by the fact that the lines are attached to the table plate from below, by means of downward-pointing connector pieces that are joined nonrotatably to the table plate in its center region, in such a way that they hang freely downward.

The object underlying the invention is completely achieved by this manner.

The multiple lines can now hang down next to one another in the center of the table plate and on its underside, being connected through the table plate with its upper side. A separate connection box on the upper side of the table plate is no longer necessary; the function of the connection box is taken over, so to speak, by the table plate itself, so that the space available on the upper side of the table plate for clamping workpieces is considerably enlarged as compared with the known machine tools. The new machine tool also, however, requires a less complex design in order to create the connection between the lines and the table plate. All that is necessary is to attach connector pieces, onto which the lines are then in turn installed, to the bottom of the table plate.

It is preferred in this context if at least one of the lines has a freely hanging length such as to allow twisting of the line as the table plate rotates back and forth.

The advantage here is that the connector pieces can be simple screw fittings with which the lines are screwed directly and immovably onto the table plate from below. The inventors of this application have, specifically, recognized that even multiple lines hanging next to one another in a confined space allow the table plate to rotate 180 degrees back and forth if they hang down freely over a corresponding length so that twisting of the lines is possible. Until now it had been assumed that such twisting of the lines was possible only if they hung freely from above onto the table plate, so that they had enough space above the table plate to rotate around one another, as is also known from DE 36 20 086 C32 mentioned above.

On the other hand, it is preferred if at least one connector piece comprises a rotary coupling.

The advantage here is that, especially when lines arranged off-center are present, twisting thereof is facilitated by the fact that the line is attached to the table plate from below via a rotary coupling. The inventors of this application have recognized here that rotary couplings of this kind can also advantageously be arranged below the table plate and outside the rotation axis in order to guide multiple lines next to one another, in a confined space, from below through the table plate to its upper side. A further advantage here is the fact that the lines can be shorter than is the case with freely hanging lines.

From DE 83 16 776 U1 mentioned above, it was until now known only to arrange such rotary couplings in the rotation axis of the turntable and, for that purpose, to install them on a cover portion of the connection box that did not rotate along with the table plate. The rotary coupling was not provided in the case of the known design to facilitate twisting of the lines.

It is further preferred if a first line extends approximately centeredly with respect to the rotation axis, and further lines are arranged preferably symmetrically with respect to the first line.

With this design, for example, the first line can be joined via a screw-on connection to the table plate, while the further lines are installed on the underside of the table plate via rotary couplings. Because of the symmetrical arrangement only very little space is required here; for example, four connection stems arranged at the corners of a square open onto the upper side of the table plate, while a further connection stem projects upward in the center of the square.

In general it is preferred if the connector pieces are attached to an adapter plate that is placed from above onto a central conduit, opening in the upper side of the table plate, into which the connector pieces project.

This feature is advantageous in terms of design, since the connector pieces can be preinstalled on the adapter plate together with the lines, which then simply need to be "threaded" from above into the conduit. The diameter of the conduit need be only so large that all the connector pieces can be introduced into it; no assembly work is required in the interior of the conduit itself. This design also allows easy maintenance: in order, for example, to replace a defective line, the adapter plate simply needs to be unscrewed and pulled upward to the point where the connector pieces are accessible.

In an embodiment, it is preferred in this context if the adapter plate has a centered through orifice into which is inserted a connector piece, for a line running centeredly with respect to the rotation axis, which has a cylindrical stud element that has connection stems on its ends and sits tightly in the through orifice.

This feature is again advantageous in terms of minimal space requirement: once the line has been attached to one of the end connection stems, the stud element simply needs to be inserted from below into the through orifice The space requirement for this connection is very small, since no union on the adapter plate is used. It is now possible, for example, to attach four lines, running outside the rotation axis, to the adapter plate via unions, and to leave in the center only enough room for the through orifice to remain open. Once the outer lines have been installed, the stud element, with the centered line attached thereon, simply needs to be slid in from below. The overall result of this design is thus also that an adapter plate with a very small outside diameter can be used, so that the overall space requirement on the upper side of the table plate is very small.

In an embodiment, it is preferred if the connector pieces for the further lines comprise rotary couplings that are attached to the adapter plate from below via a screw-on connection.

The rotary couplings have the advantage, already mentioned above, that very little space is required overall for the lines in order to allow them to twist as the table plate rotates 180 degrees back and forth. It is thus possible, particularly in conjunction with the aforementioned stud element, to connect, for example, five lines on the table plate in a very small amount of space.

In an embodiment, it is preferred if the stud is secured to the adapter plate by pinning.

The advantage here is that after insertion of the stud, pinning ensures that the latter cannot rotate with respect to the table plate. This is made possible, by way of the simplest possible design, by pinning.

It is further preferred if a pin, which sits approximately half in the stud element and half in the adapter plate, is inserted from above into the adapter plate parallel to the rotation axis.

The advantage here is that this is a pin connection of very simple design: the hole receiving the pin, which sits approximately half in the stud element and half in the adapter plate, can be drilled after insertion of the stud element, so that overall assembly is greatly simplified. This is because when the stud element is inserted, there is no need to ensure at that time that the two halves of the orifices provided for the pin align with one another. This feature also has advantages as compared with a pin that is inserted transverse to the rotation axis, since with this design as well it would be necessary to ensure, as soon as the stud element was introduced, that the holes provided for the pin in the stud element and table plate aligned with one another.

It is furthermore preferred if the stud element is adhesively bonded into the through orifice.

The advantage of this feature is that the stud element can be easily held in axially nondisplaceable fashion.

Further advantages are evident from the description and the appended drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

Embodiments of the invention are shown in the appended drawings and will be explained in more detail in the description below. In the drawings.

DESCRIPTION OF THE PREFERRED EMBODIMENTS

Figure 1:
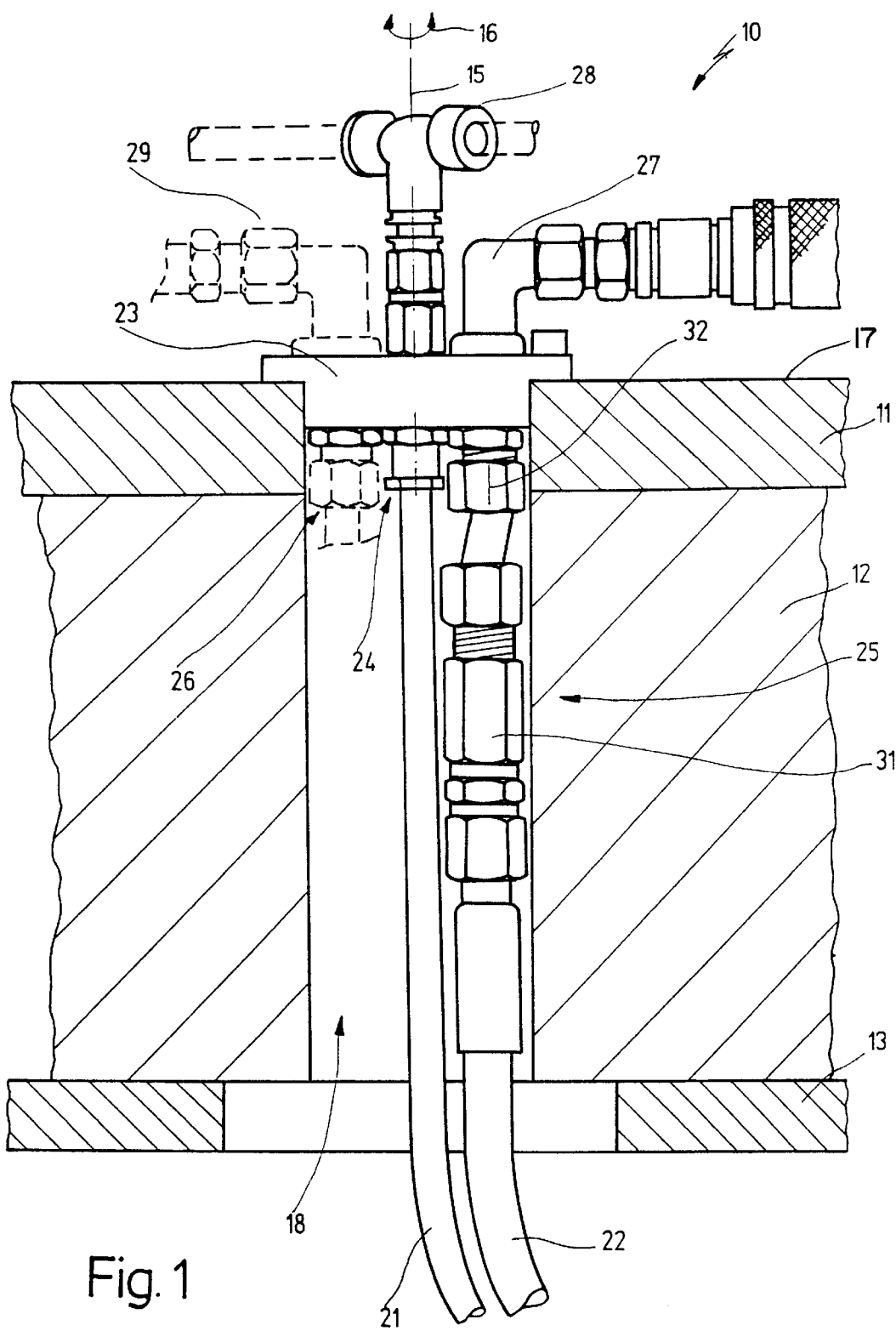
FIG. 1 shows a longitudinal section through a turntable of the new machine tool.

In FIG. 1, 10 indicates a turntable of an otherwise not depicted machine tool. Turntable 10 has a table plate 11 as well as a table housing 12 that is joined nonrotatably to a machine frame 13. Table plate 11 can be moved back and forth in known fashion with respect to machine frame 13 about a rotation axis 15 in the direction of a double arrow 16.

Turntables of this kind serve as tool changers, offering in succession to the spindle of the machine tool workpieces that are clamped in place on its upper side 17 in receptacles not depicted in FIG. 1. Hydraulic oil or compressed air is required to actuate these receptacles, and cooling and flushing oil is required during the machining operations for flushing and cooling. In addition, dividing attachments, measurement devices, etc., operated fluidically or electrically, may be arranged on upper side 17.

Fluidic and/or electrical energy is supplied via a conduit 18, arranged centeredly in table plate 11 and in table housing 12, which opens onto upper side 17. Running in this conduit are, for example in FIG. 2, two lines 21 and 22, line 21 being a compressed-air line and line 22 a hydraulic line. The two lines come from stationary supply connections for fluids.

An adapter plate 23, which projects with a flange into conduit 18, sits on the top of conduit 18. In FIG. 1, connector pieces 24, 25, and 26 are attached from below to adapter plate 23. Associated with these connector pieces 24, 25, and 26 on upper side 17 are an angled piece 27 for a hydraulic connection, a T-piece 28 for a pneumatic connection, and a further angled piece 29 for a hydraulic connection.

Line 21 is immovably joined to connector piece 24, so that it twists as table plate 11 rotates. The freely hanging length of line 21 running centeredly with respect to rotation axis 15 is sufficient that this twisting can occur in the relatively confined conduit 18 without compressing line 21.

In contrast, connector piece 25 for line 22 which extends off-center comprises a rotary coupling 31 which is screwed from below onto adapter plate 23 via a screw-on connection 32. Rotary coupling 31 now allows line 22 to rotate with respect to screw-on connection 32. As table plate 11 rotates, rotary coupling 31 assists the necessary twisting of line 22, so that this is possible in the relatively confined conduit 18 even though line 22 is arranged outside rotation axis 15 and can itself be relatively short.

Of course a corresponding line, attached to adapter plate 23 via a rotary coupling and a schematically indicated screw-on connection, is also associated with connector piece 26. For reasons of clarity, however, these components are not depicted in FIG. 1.

Figure 2:
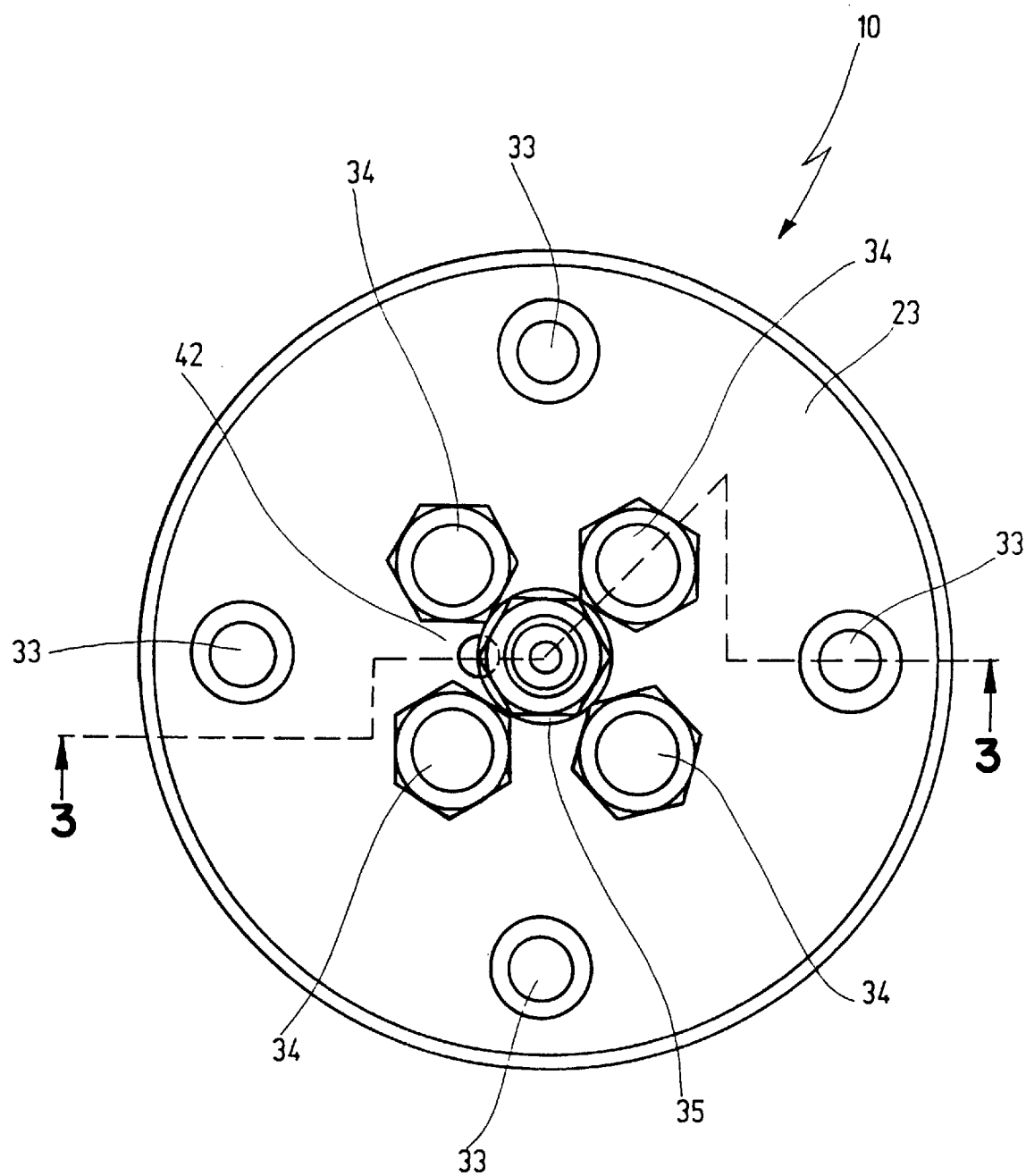
FIG. 2 shows a plan view of an adapter plate such as can be used with the turntable of FIG. 1.

FIG. 2 shows a plan view of an adapter plate 23 which has a slightly different design from adapter plate 23 of FIG. 1, but serves the same purpose.

It is firstly evident from FIG. 2 that four machine bolts 33, with which adapter plate 23 is bolted onto table plate 11, sit in adapter plate 23. Also evident are four screw connections 34 onto which, for example, angled pieces 27 and 29 and/or T-piece 28 can be screwed. The four screw connections sit at the corners of a square, a further, centered screw connection 35 being provided in the center of the square.

In this manner it is possible to guide five lines in conduit 18; a rotation (180 degrees back and forth) of table plate 11 causes line 21 connected to screw connection 35 to twist on itself, while the lines connected from below to the outer screw connections 34, such as for example line 22, can rotate via rotary coupling 31 and twist.

Figure 3:
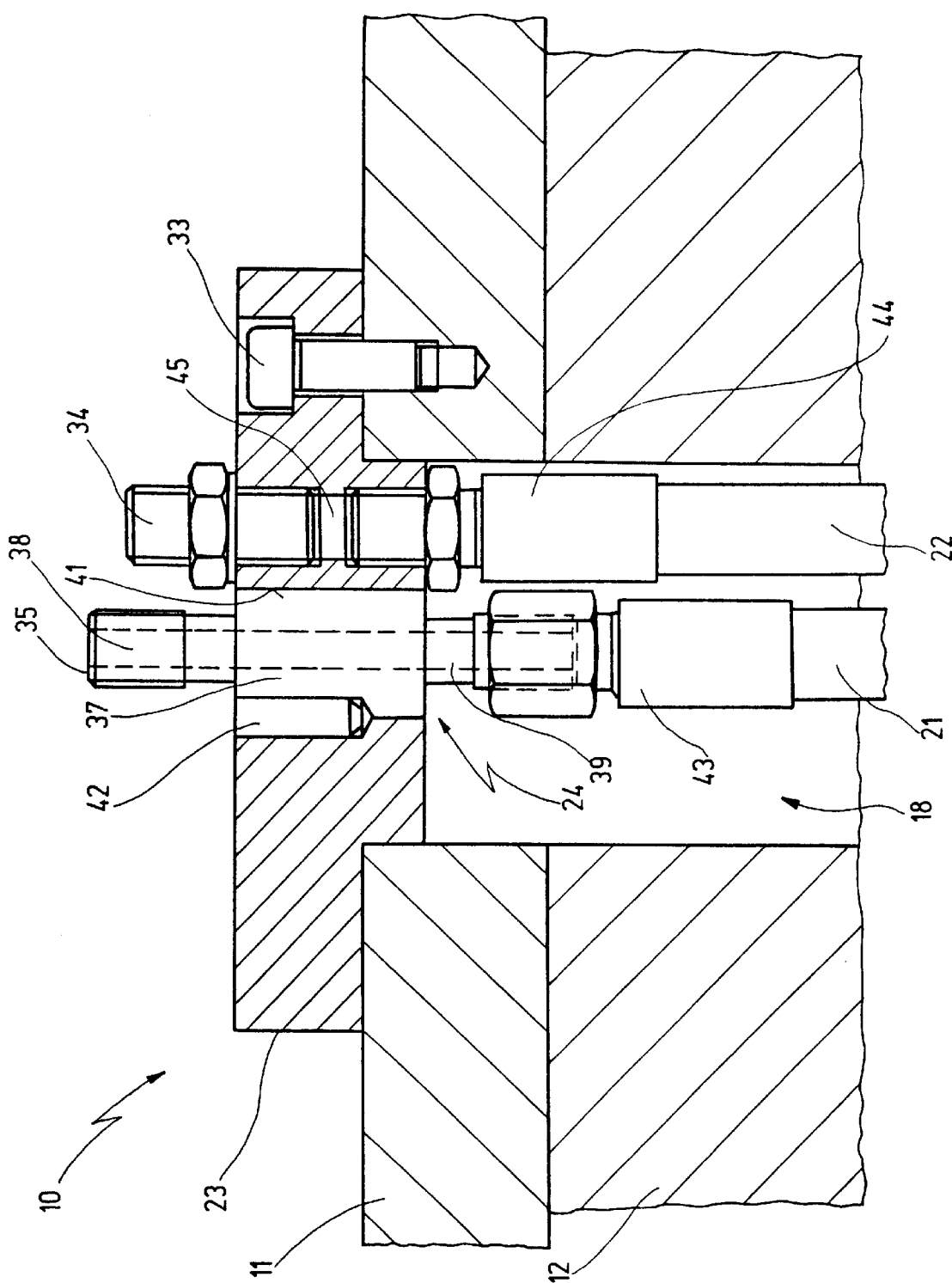
FIG. 3 shows a cross section, along line III—III in FIG. 2, through a further embodiment of the turntable of the new machine tool.

FIG. 3, however, shows a further embodiment in which rotary coupling 31 has been completely omitted. FIG. 3 is a section along line III—III of FIG. 2. For reasons of clarity, FIG. 3 shows only one machine bolt 33 and one screw connection 34, and lastly screw connection 35.

In contrast to the design seen in FIG. 1, connector piece 24 here comprises a cylindrical stud element 37 onto which connection stems 38 and 39 are fitted at top and bottom. Stud element 37 is fitted into a through orifice 41 which passes centeredly through adapter plate 23. Stud element 37 is preferably adhesively bonded into through orifice 41.

To reinforce the connection between stud element 37 and adapter plate 23, a pin 42 is provided which runs parallel to rotation axis 15 and sits approximately half in stud element 37 and half in adapter plate 23.

A screw-on connection 43, by means of which line 21 is joined immovably to connector piece 24 and thus to table plate 11, is screwed onto the lower connection stem 39.

Line 22 extending outside rotation axis 15 is screwed by means of a screw-on connection 44 into a tapped orifice 45 in adapter plate 23. Screw connection 44 is screwed from above into this tapped orifice 45.

It is evident from FIG. 3 that lines 21, 22 are arranged in a very confined space in conduit 18. Because of their sufficient freely hanging length, however, they can twist in conduit 18 when table plate 11 is rotated with respect to table housing 12. The length of the lines here is optionally greater than in the case of the embodiment according to FIG. 2.

The diameter of adapter plate 23 is so small that screw-on connections 43 and 44 are located very close together. To make installation of lines 21, 22 onto adapter plate 23 possible at all, the outer lines 22 are first screwed into tapped orifices 45 via screw-on connections 44. Once the four outer lines 22 have been attached, centered line 21 is first screwed onto connector piece 24. The latter is then slid from above into through orifice 41 until upper connection stem 38 projects sufficiently upward. Stud element 37 that is then introduced into through orifice 41 is then optionally adhesively bonded, whereupon an orifice is made into which pin 42 is inserted. In this very simple manner, a total of five lines 21, 22 can be attached from below onto adapter plate 23 in a very confined space. These lines are then threaded from above into conduit 18, and the latter is then closed off by adapter plate 23. Adapter plate 23 is thereupon bolted immovably onto table plate 11 by means of machine bolts 33.

If one of lines 21, 22 needs to be replaced, all that is necessary is to loosen machine bolts 33 so that adapter plate 23, with lines 21, 22 hanging from it, can be pulled upward so that screw-on connections 43, 44 are accessible.

What I claim, is:

1. A machine tool, having a machine frame, a turntable that is pivotably supported at said machine frame for rotation about a rotation axis, said turntable comprising a table plate having a center region, an upper side and a bottom side, at said bottom side downward pointing connector pieces being joined nonrotatably to said table plate in its center region, and supply lines attached to said connector pieces and hanging freely downward beneath said table plate, whereby said supply lines lead to said upper side of said table plate, wherein the connector pieces are attached to an adapter plate that is placed from above onto a central conduit having an opening in the upper side of the table plate, the connector pieces projecting into said central conduit, and the adapter plate has a centered through orifice into which is inserted one of said connector pieces, for one of said lines running centeredly with respect to the rotation axis, said one connector piece having a cylindrical stud element that has connection stems on its ends and sits tightly into the through orifice.

2. The machine tool of claim 1, wherein at least one of the lines has a freely hanging length such as to allow twisting of the line as the table plate rotates back and forth.

3. The machine tool of claim 1, wherein at least one of said connector pieces comprises a rotary coupling.

4. The machine tool of claim 1, wherein a first line extends approximately centeredly with respect to the rotation axis, and further lines are arranged preferably symmetrically with respect to the first line.

5. The machine tool of claim 1, wherein the connector pieces are attached to an adapter plate that is placed from above onto a central conduit, opening in the upper side of the table plate, into which the connector pieces project.

6. The machine tool of claim 5, wherein the adapter plate has a centered through orifice into which is inserted a connector piece, for a line running centeredly with respect to the rotation axis, which has a cylindrical stud element that has connection stems on its ends and sits tightly in the through orifice.

7. The machine tool of claim 6, wherein the connector pieces for the further lines comprise rotary couplings that are attached to the adapter plate from below via a screw-on connection.

8. The machine tool of claim 7, wherein the stud element is secured to the adapter plate by pinning.

9. The machine tool of claim 8, wherein a pin, which sits approximately half in the stud element and half in the adapter plate, is inserted from above into the adapter plate parallel to the rotation axis.

10. The machine tool of claim wherein the stud element is adhesively bonded into the through orifice.

11. A machine tool, having a machine frame, a turntable that is pivotably supported at said machine frame for rotation about a rotation axis, said turntable comprising a table plate having a center region, an upper side and a bottom side, at said bottom side downward pointing connector pieces being joined nonrotatably to said table plate in its center region, and supply lines attached to said connector pieces and hanging freely downward beneath said table plate, whereby said supply lines lead to said upper side of said table plate, wherein a first of said lines extends approximately centeredly with respect to the rotation axis, and further ones of said lines are arranged symmetrically with respect to the first line, the connector pieces are attached to an adapter plate that is placed from above onto a central conduit, said central conduit having an opening in the upper side of the table plate, the connector pieces projecting into said central conduit, and the adapter plate has a centered through orifice into which is inserted one of said connector pieces for said first line, said one connector piece having a cylindrical stud element that has connection stems on its ends and sits tightly into the through orifice.

12. The machine tool of claim 11, wherein at least one of the lines has a freely hanging length such as to allow twisting of the line as the table plate rotates back and forth.

13. The machine tool of claim 11, wherein at least one of said connector pieces comprises a rotary coupling.

14. The machine tool of claim 11, wherein the connector pieces are attached to an adapter plate that is placed above onto a central conduit, opening in the upper side of the table plate, into which the connector pieces project.

15. The machine tool of claim 11, wherein the adapter plate has a centered through orifice into which is inserted a connector piece, for a line running centeredly with respect to the rotation axis, which has a cylindrical stud element that has connection stems on its ends and sits tightly in the through orifice.

16. The machine tool of claim 11, wherein the connector pieces for the further lines comprise rotary couplings that are attached to the adapter plate from below via a screw-on connection.

17. The machine tool of claim 16, wherein the stud element is secured to the adapter plate by pinning.

18. The machine tool of claim 17, wherein a pin, which sits approximately half in the stud element and half in the adapter plate, is inserted from above into the adapter plate parallel to the rotation axis.

19. The machine tool of claim 18, wherein the stud element is adhesively bonded into the through orifice.

* * * * *